(12) United States Patent
Chang et al.

(10) Patent No.: US 9,285,256 B1
(45) Date of Patent: Mar. 15, 2016

(54) ELECTROMAGNETIC FLOWMETER WITH VARIABLE-FREQUENCY CONDUCTIVITY-SENSING FUNCTION FOR A LIQUID IN A TUBE

(71) Applicant: FINETEK Co., Ltd., New Taipei (TW)

(72) Inventors: Ming-Hui Chang, New Taipei (TW);
Chi-Chih Chou, New Taipei (TW);
Chun-Ju Chen, New Taipei (TW);
Yi-Liang Hou, New Taipei (TW)

(73) Assignee: Finetek Co., Ltd., New Taipei (TW)

( * ) Notice: Subject to any disclaimer, the term of this patent is extended or adjusted under 35 U.S.C. 154(b) by 23 days.

(21) Appl. No.: 14/524,695

(22) Filed: Oct. 27, 2014

(51) Int. Cl.
*G01F 1/56* (2006.01)
*G01F 1/64* (2006.01)
*H01L 31/12* (2006.01)

(52) U.S. Cl.
CPC . *G01F 1/64* (2013.01); *H01L 31/12* (2013.01)

(58) Field of Classification Search
CPC ................ G01F 1/58; G01F 1/60; G01F 1/56
USPC ............... 73/861.08, 861.11, 861.12, 861.16; 702/87
See application file for complete search history.

(56) References Cited

U.S. PATENT DOCUMENTS

| | | | | |
|---|---|---|---|---|
| 4,676,112 A * | 6/1987 | Uematsu | ................... | G01F 1/60 73/1.34 |
| 5,388,465 A * | 2/1995 | Okaniwa | ................... | G01F 1/60 73/861.12 |
| 6,571,642 B1 * | 6/2003 | Feller | ..................... | G01F 1/584 73/861.12 |
| 6,722,207 B1 * | 4/2004 | Feller | ..................... | G01F 1/58 73/861.12 |
| 7,117,750 B2 * | 10/2006 | Brockhaus | ................ | G01F 1/60 73/861.12 |
| 7,194,918 B2 * | 3/2007 | Brockhaus | .......... | G01F 25/0007 73/861.12 |
| 7,971,493 B2 * | 7/2011 | Hencken | ................ | G01F 1/584 73/861.12 |
| 8,590,361 B1 * | 11/2013 | Feller | ..................... | G01F 1/60 702/87 |

* cited by examiner

*Primary Examiner* — Jewel V Thompson
(74) *Attorney, Agent, or Firm* — Muncy, Geissler, Olds & Lowe, P.C.

(57) ABSTRACT

An electromagnetic flowmeter with variable-frequency conductivity-sensing function for a liquid in a tube includes a first microprocessor, a transducer, flow-sensing device, an exciting-current generating device, a variable-frequency conductivity measuring device, and a switch. The transducer includes coils and sensing electrodes. The switch is electrically connected to the first microprocessor and the sensing electrodes. The switch is selectively connected to the flow-sensing device or the variable-frequency conductivity measuring device according to the signals sent from the first microprocessor. The microprocessor makes the exciting-current generating device to generate an exciting current when the switch is connected to the flow-sensing device. The first microprocessor makes the exciting-current generating device stop to generate exciting current and computes conductivity of liquid when the switch is electrically connected to the variable-frequency conductivity-sensing device.

9 Claims, 6 Drawing Sheets

ELECTROMAGNETIC FLOWMETER WITH VARIABLE-FREQUENCY CONDUCTIVITY-SENSING FUNCTION FOR A LIQUID IN A TUBE

BACKGROUND OF THE INVENTION

1. Field of the Invention

The present invention relates to, a flowmeter, and more particularly, to an electromagnetic flowmeter with variable-frequency conductivity-sensing function for a liquid in a tube.

2. Description of Related Art

Conductance refers to the ability of materials to allow currents to flow through. In a solid, the current is transmitted via electrons. In a liquid, the current is transmitted via the movement of cation and anion. Conductivity refers to the ability of materials to transmit the current. The conductivity of a liquid is relevant to the concentration of the dissolved ions. The conductivity meter is a device for measuring the ability of transmitting currents for a liquid.

Traditional conductivity meter often uses a constant current source (micro-ampere class) or a Wheatstone bridge structure for measuring. However, it's easy to be influenced by the noises and ripples in circuit because output current is small. Also, the measuring range is not large enough so that the measuring precision is not stable and not high enough.

Further, the traditional conductivity meter measures the conductivity of a liquid usually via a constant induced current. However, when the conductivity of the liquid is rather low, the induced current for measuring liquids would also decrease. It may result in difficulties when manufacturing the conductivity meter because it is hard to generate induced currents which are small.

SUMMARY OF THE INVENTION

The present invention provides an electromagnetic flowmeter with variable-frequency conductivity-sensing function for a liquid in a tube. The electromagnetic flowmeter and the liquid collectively generate a square-wave signal, the microprocessor of the electromagnetic flowmeter calculates conductivity of the liquid according to the frequency of the square-wave signal. Compare to the traditional conductivity meter, the present invention can measure liquid with lower conductivity and is convenient to manufacture.

In order to realize the above mentioned function, the electromagnetic flowmeter with variable-frequency conductivity-sensing function for a liquid in a tube comprises a first microprocessor, a transducer, an exciting-current generating device, a flow-sensing device, a variable-frequency conductivity measuring device, and a switch. The transducer comprises two coils and two sensing electrodes. The exciting-current generating device is electrically connected to the first microprocessor and the coils. The flow-sensing device is electrically connected to the first microprocessor. The variable-frequency conductivity measuring device is electrically connected to the first microprocessor, and the switch is electrically connected to the sensing electrodes, the first microprocessor, the flow-sensing device, and the voltage-amplitude conductivity measuring device.

The switch makes an electrical connection between the sensing electrodes and the flow-sensing device or an electrical connection between the sensing electrodes and the variable-frequency conductivity measuring device according to a signal sent by the first microprocessor, the first microprocessor makes the exciting-current generating device generate an exciting current when the sensing electrodes and the flow-sensing device are electrically connected so as to calculate flow rate of the liquid, the first microprocessor stops the exciting-current generating device to generate the exciting current when the sensing electrodes and the variable-frequency conductivity measuring device are electrically connected, the variable-frequency conductivity measuring device outputs a square-wave signal when the sensing electrodes are immerged into the liquid so as to calculate conductivity of the liquid.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Based on a preferred embodiment of the present invention, it is described with figures as below.

Figure 1:
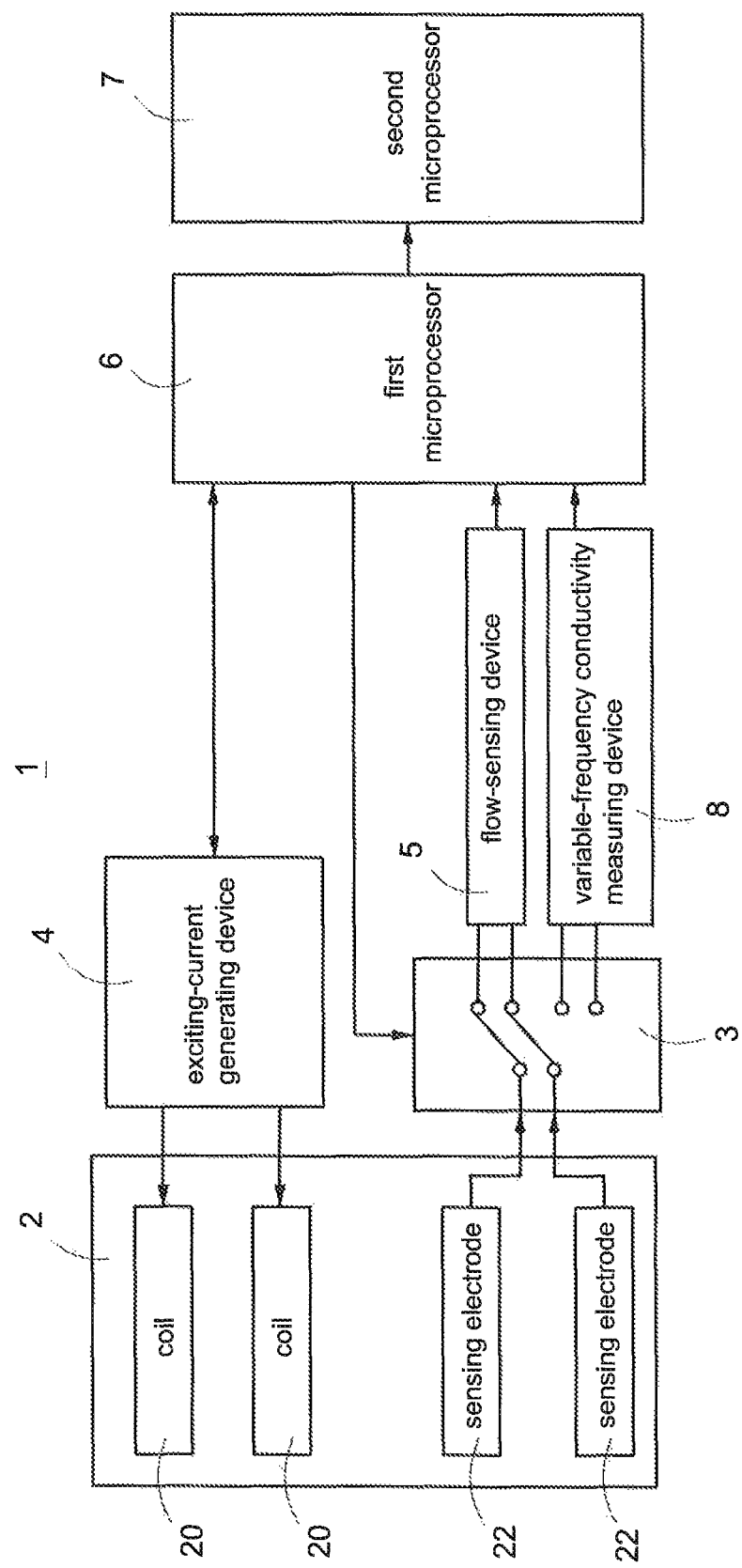
FIG. 1 is a circuit block diagram of an electromagnetic flowmeter with variable-frequency conductivity-sensing function for a liquid in a tube of the present invention, which is operated in a first status.
Figure 2:
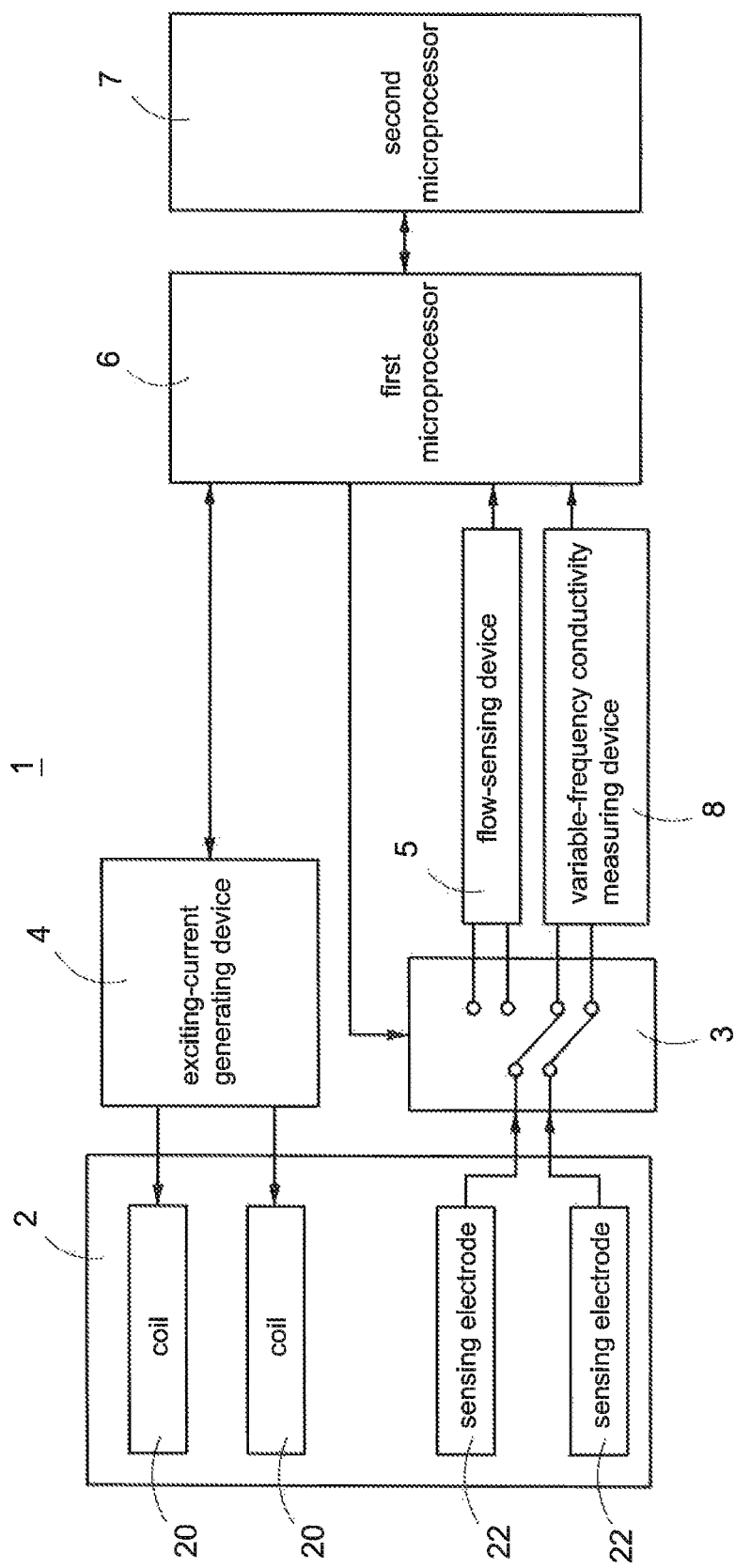
FIG. 2 is a circuit block diagram of the electromagnetic flowmeter with variable-frequency conductivity-sensing function for a liquid in a tube of the present invention, which is operated in a second status.

In conjunction with FIG. 1 and FIG. 2, FIG. 1 and FIG. 2 are circuit block diagrams of electromagnetic flowmeter with variable-frequency conductivity-sensing function for a liquid in a tube of the present invention, which are operated in a first status and a second status respectively. When operated in the first status, the electromagnetic flowmeter 1 is used to sense the flow rate of a liquid. When operated in the second status, the electromagnetic flowmeter 1 is used to measure the conductivity of the liquid, and to determine how the wear of the sensing electrode 22 is and whether the tube for transmitting the liquid to be measured is empty.

The electromagnetic flowmeter with variable-frequency conductivity-sensing function for a liquid in a tube 1 comprises a transducer 2, a switch 3, an exciting-current generating device 4, a flow-sensing device 5, a first microprocessor 6, a second microprocessor 7, and a variable-frequency conductivity measuring device 8. The transducer 2 is electrically connected to the switch 3 and the exciting-current generating device 4. The transducer 2 comprises two coils 20 and two sensing electrodes 22. The coils 20 are electrically connected to the exciting-current generating device 4, and the sensing electrodes 22 are electrically connected to the switch 3. The sensing electrodes 22 may be made from materials such as graphite, cupper sheet, platinum or other metals, which are immerged into the liquid which is to be measured.

The switch 3 is electrically connected to the flow-sensing device 5 and the variable-frequency conductivity measuring device 8. The first microprocessor 6 is electrically connected to the switch 3, the exciting-current generating device 4, and the variable-frequency conductivity measuring device 8. The second microprocessor 7 is electrically connected to the first microprocessor 6.

The first microprocessor 6 is configured to control the switching status of the switch 3 and the operating status of the exciting-current generating device 4, and to receive and process signals sent from the exciting-current generating device 4, the flow-sensing device 5, and the variable-frequency conductivity measuring device 8. The second microprocessor 7 is configured to process signals related to display, signal input and output or transmission interface. Herein, the first microprocessor 6 is configured to control and transmit the internal signals of the electromagnetic flowmeter 1. The second microprocessor 7 is configured to control the external communication signal transmission of the electromagnetic flowmeter 1. Thereby, it prevents from the interference resulted between signals transmitted inside the electromagnetic flowmeter 1 and signals for external communication of the electromagnetic flowmeter 1. Also, the signals can be efficiently distributed and used. It should be noted that, the first microprocessor 6 and the second microprocessor 7 may be electrically connected to an external communication interface so as to store or transmit data. Practically, the first microprocessor 6 and the second microprocessor 7 may be integrated into a single processor.

The switch 3 determines the operation device of the electromagnetic flowmeter 1 according to the control signal sent by the first microprocessor 6. In the first status (as shown in FIG. 1), the switch 3 electrically connects the sensing electrode 22 and the flow-sensing device 5, and the electromagnetic flowmeter 1 is used to sense the flow rate of the liquid which is to be measured. In the second status (as shown in FIG. 2), the switch 3 electrically connects the sensing electrode 22 and the variable-frequency conductivity measuring device 8, and the electromagnetic flowmeter 1 is used to measure the conductivity of the liquid to be measured.

Figure 3:
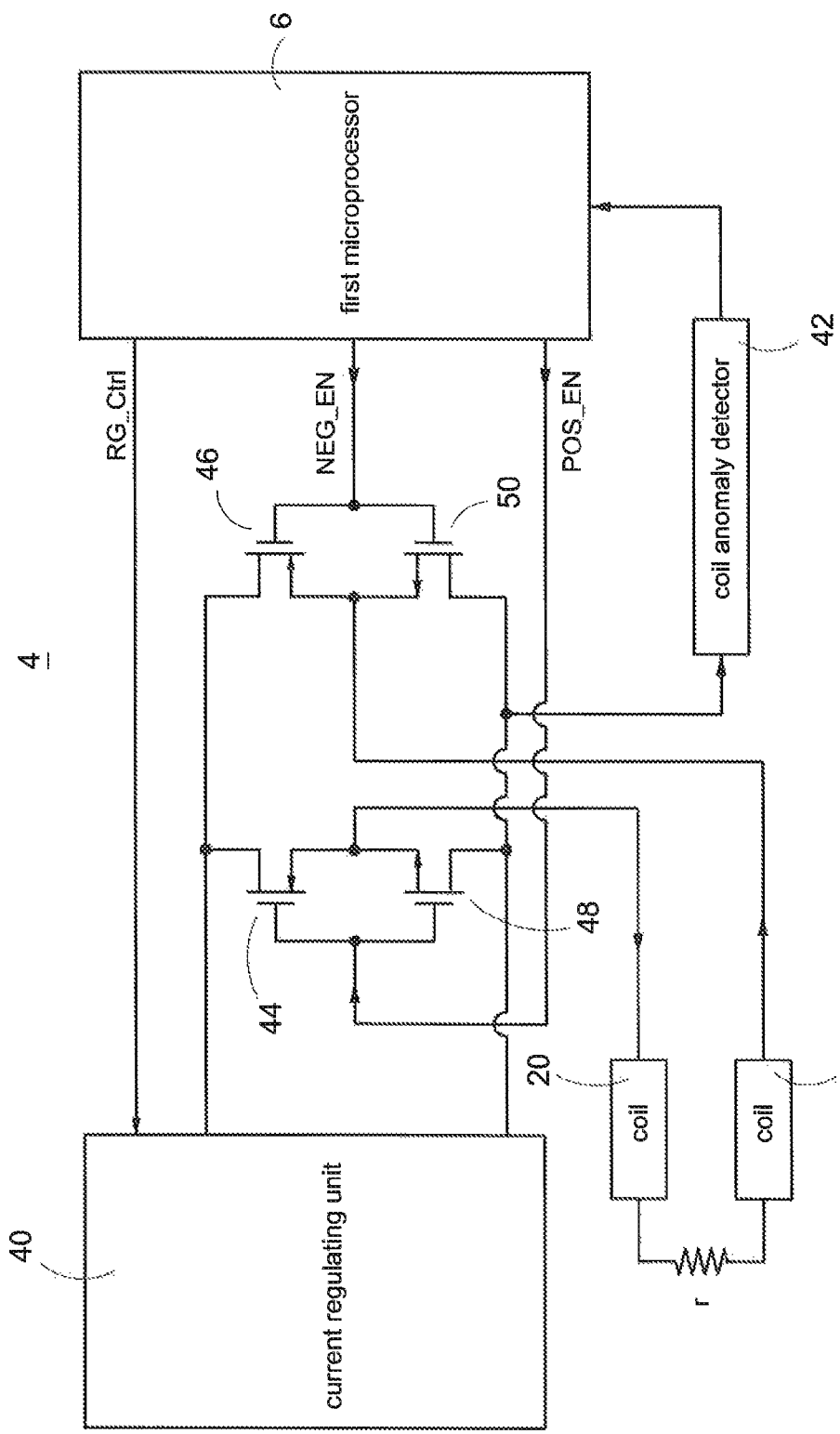
FIG. 3 is a circuit diagram of an exciting-current generating unit of the present invention.

Please refer to FIG. 3, the exciting-current generating device 4 comprises a current regulating unit 40, a coil anomaly detector 42, a first switch element 44, a second switching element 46, a third switching element 48, and a fourth switching element 50. The first microprocessor 6 is electrically connected to the current regulating unit 40 and the coil anomaly detector 42. The detection signal output end RG_Ctrl of the first microprocessor 6 outputs a detection signal so as to dynamically adjust the constant current value output by the current regulating unit 40. Herein, the constant current refers to the current having no volatility; however, the constant current value can be adjusted by the signal output by the first microprocessor 6.

In this embodiment, the first switching element 44 and the second switching element 46 are respectively P type metal-oxide-semiconductor field-effect transistor (MOSFET). The third switching element 48 and the fourth switching element 50 are N type MOSFETs. Drain of the first switching element 44 is electrically connected to the current regulating unit 40. Gate of the first switching element 44 is electrically connected to the first signal output end POS_EN of the first microprocessor 6. Source of the first switching element 44 is electrically connected to source of the third switching element 48 and the coil 20. Drain of the second switching element 46 is electrically connected to the current regulating unit 40. Gate of the second switching element 46 is electrically connected to the second signal output end NEG_EN of the first microprocessor 6 and gate of the fourth switching element 50. Source of the second switching element 46 is electrically connected to source of the fourth switching element 50 and the coil 20. Drains of the third switching element 48 and the fourth switching element 50 are electrically connected to the current regulating unit 40 and the coil anomaly detector 42.

The current regulating unit 40 generates the constant current, which is controlled by the first microprocessor 6. The first microprocessor 6 determines whether to transmit the constant current generated by the current regulating unit 40 to the coil 20 via controlling the switching statuses of the first switching element 44, the second switching element 46, third switching element 48 and the fourth switching element 50.

When the first signal output end POS_EN and the second signal output end NEG_EN of the first microprocessor 6 outputs high potential signals or low potential signals simultaneously, the first switching element 44, the second switching element 46, third switching element 48, and the fourth switching element 50 are cut off, and the constant current generated by the current regulating unit 40 can't be transmitted to the coil 20.

Figure 5:
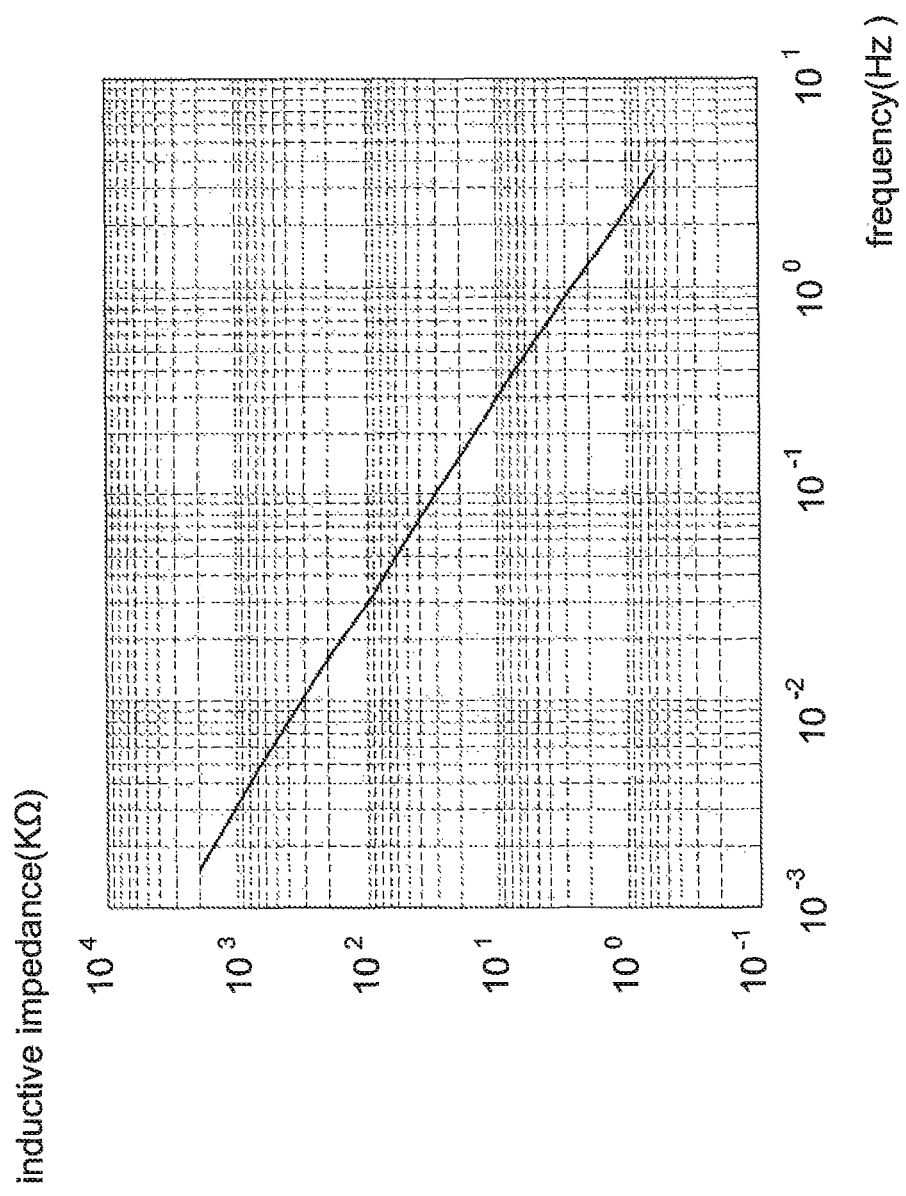
FIG. 5 is a relationship diagram of the frequency with respect to the inductive impedance.

When the first signal output end POS_EN outputs a low potential signal and the second signal output end NEG_EN outputs a high potential signal, the first switching element 44 and the fourth switching element 50 are turned on and the second switching element 46 and the third switching element 48 are cut off. The constant current generated by the current regulating unit 40 is transmitted from the upper coil 20 to the lower coil 20 (as shown in FIG. 5).

When the first signal output end POS_EN outputs a high potential signal and the second signal output end NEG_EN outputs a low potential signal, the first switching element 44 and the fourth switching element 50 are cut off and the second switching element 46 and the third switching element 48 are turned on. The constant current generated by the current regulating unit 40 is transmitted from the lower coil 20 to the upper coil 20 (as shown in FIG. 5). That is, as long as the first signal output end POS_EN and the second signal output end NEG_EN respectively output signal having different potentials, the constant current generated by the current regulating unit 40 would flow through the coil 20.

Figure 4:
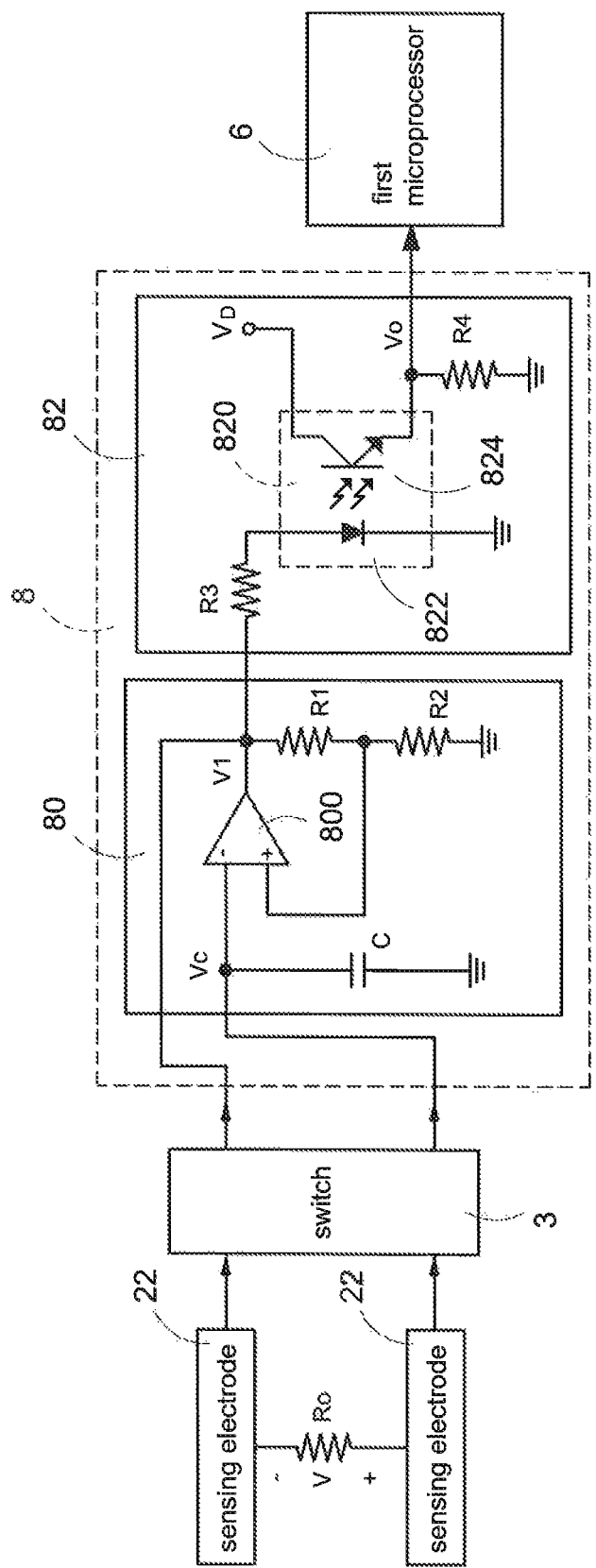
FIG. 4 is a circuit diagram of a variable-frequency conductivity measuring device of the present invention.

Please refer to FIG. 4, FIG. 4 is a circuit diagram of a variable-frequency conductivity measuring device of the present invention. Herein, the sensing electrodes 22, the switch 3, and the first microprocessor 6 are also shown in the FIG. 4. The variable-frequency conductivity measuring device 8 comprises square-wave generator 80 and a level converter 82. The square-wave generator 80 is electrically connected to the switch, and when the electromagnetic flowmeter 1 is operated under the second status, the variable-frequency conductivity measuring device 8 is electrically connected to the sensing electrodes 22 via the switch 3. The square-wave generator 80 comprises an operational amplifier 800, a capacitor C, a first resistor R1, and a second resistor R2. The operational amplifier 800 comprises an inverted input, a non-inverted input, and an output. The inverted input is electrically connected to the switch 3 and the capacitor C. The second resistor R2 is electrically connected to the first resistor R1 in series. One end of the first resistor R1 connected to the second resistor R2 is electrically connected to the non-inverted input, and the other opposite to the end connected to the second resistor R2 is electrically connected to the output The level converter 82 comprises a photocoupler, a current-limiting resistor R3, and a pull-down resistor R4. The photocoupler 82 comprises a light emitter 822 and a photo-sensor 824. The light emitted 822 is, for example, light emitting diode, and the photo-coupler is, for example, phototransistor. Anode of the light emitter is electrically connected to the current-limiting resistor, and cathode thereof is electrically connected to ground. Collector of the photo-sensor is electrically connected to a direct current power source VD, emitter thereof is electrically connected to the pull-down resistor R4 and the first processor 6. The pull-down resistor R4 is used for maintaining signal passing through at a state near zero volt.

When the electromagnetic flowmeter 1 is operated under the second status, there is inductive impedance Ro generated between the sensing electrode 22 and the liquid, and the inductive impedance Ro may vary based on different liquids.

When the operational amplifier 800 is powered on, the voltage across the capacitor C is zero, and an input voltage of the inverted input of the operational amplifier 800 is also zero, thus the output of the operational amplifier 800 outputs a positive saturation voltage. When the voltage across the capacitor C is larger than the voltage received by the non-inverted input of the capacitor C, the output of the operational amplifier 800 outputs a negative saturation voltage, and the capacitor C discharges by the inductive impedance Ro and the output of the operational amplifier 800. When the voltage across the capacitor C is smaller than the voltage received by the non-inverted input of the capacitor c, the output of the operational amplifier 800 outputs positive saturation voltage. In sum, the operational amplifier 800 determined whether the voltage outputted from the output is a negative saturation voltage or positive saturation voltage according to the comparing result between the voltages respectively inputted from the inverted input and the non-inverted input, thus the operational amplifier 800 outputs square-wave signal.

After that, the square-wave signal outputted from the operational amplifier 800 is transmitted to the light emitter 820 via the current-limiting resistor R3, and then isolated-transmitted to the photo-sensor 822. Thereby, the level converter 82 limits the peak of the square-wave signal outputted from the operational amplifier 820 to be equal to that of the direct current power source. Besides, the photocoupler 82 prevent the signal outputted form the variable-frequency conductivity measuring device 8 from interference by the signal inputted the variable-frequency conductivity measuring device 8, thus the variable-frequency conductivity measuring device 8 has advantages of high anti-interference capacity, stable, and then achieve long life time and high transmitting efficiency.

It should be noted that the variable-frequency conductivity measuring device 8 determined the conductivity of the liquid to be measured via the mechanism converting frequency to impedance (see details as below).

Please again refers to FIG. 1, when the electromagnetic flowmeter 1 is operated in the first status, the first microprocessor 6 delivers a control signal to control the switch 3 so as to electrically connect the sensing electrode 22 and the flow-sensing device 5. Thereby, the electromagnetic flowmeter 1 can sense the flow rate of the liquid to be measured. Also, the first microprocessor 6 delivers a control signal to the exciting-current generating device 4 so as to make the exciting-current generating device 4 generate the exciting current.

In particular, the method of transmitting the constant current generated by the current regulating unit 40 to the coil 20 comprises: 1) The first signal output end POS_EN of the first microprocessor 6 outputs a high potential signal and the second signal output end NEG_EN of the first microprocessor 6 outputs a low potential signal respectively. Thereby, the first switching element 44 and the fourth switching element 50 are turned on, and the constant current generated by the current regulating unit 40 can be transmitted to the coil 20. 2) The first signal output end POS_EN of the first microprocessor 6 outputs a low potential signal and the second signal output end NEG_EN of the first microprocessor 6 outputs a high potential signal respectively. Thereby, the second switching element 46 and the third switching element 48 are turned on, and the constant current generated by the current regulating unit 40 can be transmitted to the coil 20.

The first microprocessor 6 makes the current transmitted to the coil 20 be a constant current pulse signal having a predetermined frequency via the signals outputted by the first output signal output end POS_EN and the second signal output end NEG_EN. The constant current pulse signal and the coil 20 generate an exciting magnetic field, wherein there is a larger exciting magnetic field generated when the current value is larger. Based on the Faraday's Law, when the conductor moves and across the magnetic field lines, there would be induced electromotive force generated at two ends of the sensing electrode 22. After the induced electromotive force is filtered (removing noises) and magnified, and has a signal conversion (converting the analog signals to the digital signals) via the flow-sensing device 5, it would be transmitted to the first microprocessor 6. Because the induced electromotive force is directly proportional to the flow rate of the liquid to be measured, the first microprocessor 6 uses the mechanism converting voltage to flow rate so as to calculate the flow rate of the liquid.

The coil anomaly detector 42 is used to determine whether the coil is abnormal. For example, the coil anomaly detector 42 may be a comparator, but it's not limited thereto, which is used to detect the current value. If the current flowing through the coil anomaly detector 42 is smaller than an initial predetermined value, the coil anomaly detector 42 would send a high potential signal to the first microprocessor 6 and drive the electromagnetic flowmeter 1 to deliver an alarming signal.

Please again refer to FIG. 2, when the electromagnetic flowmeter 1 is operated in the second status, the first microprocessor 6 controls the switch 3 to electrically connect the sensing electrode 22 and the variation-frequency conductivity measuring device 8 so as to measure the conductivity of the liquid to be measured. Also, the first signal output end POS_EN and the second signal output end NEG_EN of the first microprocessor 6 simultaneously outputs high potential signals or low potential signals so as to cut off the first switching element 44, the second switching element 46, the third switching element 48 and the four switching element 50 at the same time. Thus, the constant current generated by the current regulating unit 40 can't be transmitted to the coil 20. That is, when the electromagnetic flowmeter 1 is operated in the second status, there is no exciting magnetic field generated.

When the electromagnetic flowmeter 1 is operated in the second status, the electromagnetic flowmeter 1 can be not only used for measuring the conductivity of the liquid to be measured but also used for determining how the wear of the sensing electrode 22 is and whether the tube for transmitting the liquid to be measured is empty.

Please again refer to FIG. 4, when the sensing electrode 22 is placed into the liquid to be measured, there is inductive impedance Ro generated between the sensing electrode 22 and the liquid, and the inductive impedance Ro may vary based on different liquids. The inductive impedance Ro, the capacitor C, and the operational amplifier 800 collectively generate square-wave signal, the square-wave signal is then transmitted to the level converter 82 for level transformation, and the level-transferred square-wave signal is transmitted to the first microprocessor 6.

The microprocessor 6 receives the level-transferred square-wave signal and obtains the value of inductive impedance via the frequency of the level-transferred square-wave signal and the relationship between the frequency and the inductance impedance shown in FIG. 5. After that, the microprocessor 6 obtains the conductivity of the liquid to be measured via the calculation with the equation between the conductivity of the inductance impedance Ro, which is σ=d/(Ro·A), wherein d is the distance between the sensing electrodes 22 and A is the contact area between the electrodes 22 and the liquid.

From the above, after the variable-frequency conductivity measuring device 8 of the present invention is powered on, the square-wave generator 8 generates a square-wave signal. The square-wave signal is transmitted to the first microprocessor 6 after level transformation. The microprocessor 6 determined the impedance of liquid to be measured via the mechanism converting impedance into conductivity.

Besides, the variable-frequency conductivity measuring device 8 of the present invention also can determine how the wear of the sensing electrodes 22 is and whether the tube for transmitting the liquid to be measured is empty. When there is certain liquid transmitted through the tube, the square-wave signal transmitted to the first microprocessor 6 should be a constant value. However, of the frequency value of the square-wave signal changes, after receiving the square-wave signal, the first microprocessor 6 can determined how the wear of the sensing electrodes 22 is and whether the tube for transmitting the liquid to be measured is empty via the mechanism converting frequency into impedance.

Figure 6:
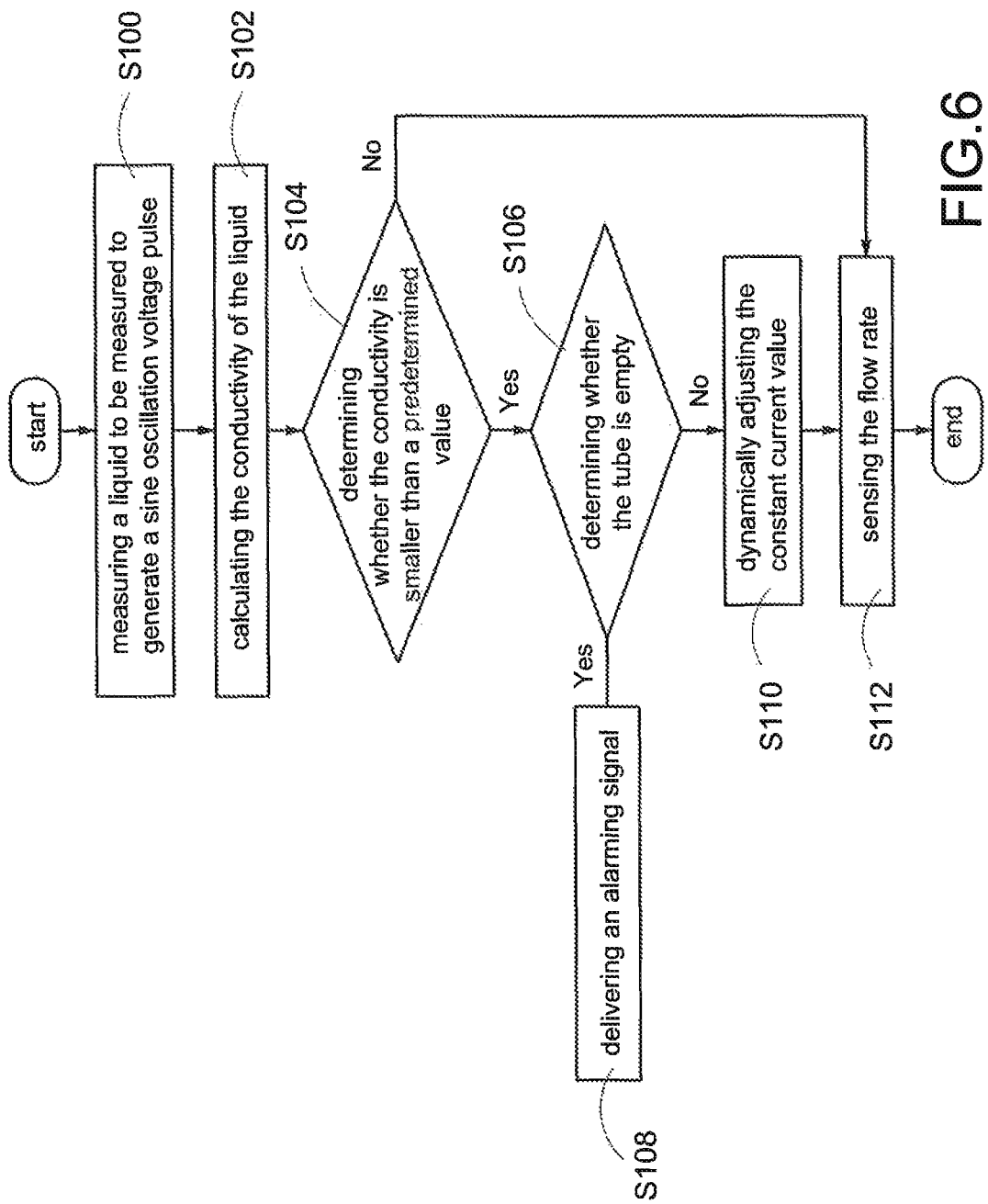
FIG. 6 is a flow chart for flow sensing and conductivity measuring of the present invention.

Please refer to FIG. 6, FIG. 6 is a flow chart for flow-sensing and conductivity measuring of the present invention. To begin with, the electromagnetic flowmeter 1 measures the conductivity of the liquid to be measured so as to determine whether the tube for transmitting the liquid to be measured is empty. If the tube for transmitting the liquid to be measured is not empty, the electromagnetic flowmeter 1 starts to sense the flow rate of the liquid.

The method for sensing conductivity and flow rate of a liquid in a tube comprises steps as follows: First, the electromagnetic flowmeter 1 is operated in a second status (that is, the sensing electrodes 22 and the variable-frequency conductivity measuring device 8 are electrically connected), and the first microprocessor 6 receives a square-wave signal generated by the variable-frequency conductivity measuring device 1 (Step S100). The first microprocessor 6, via the above square-wave signal, calculates the impedance with the mechanism converting frequency into impedance, and calculates the conductivity with the mechanism converting impedance into conductivity (Step S102).

After that, the first microprocessor 6 determines whether the above conductivity is low (Step S104). If the above conductivity is low, the first microprocessor 6 further determines whether the tube for transmitting the liquid to be measured is empty (Step S106). After the Step S104, if the conductivity is not larger than a predetermined value, it starts to calculate the flow rate of the liquid to be measured (Step S112). If the first microprocessor 6 determines that the tube for transmitting the liquid to be measured is empty via the above conductivity, there is an alarming signal delivered (Step S108).

If the first microprocessor 6 determines that the tube for transmitting the liquid to be measured is not empty via the above conductivity, it means that the conductivity is low in this status so that the electromagnetic flowmeter 1 is operated in the first status (that is, the electrodes 22 and the flow-sensing device 5 are electrically connected). After that, a detection signal output from the detection signal output end RG_Ctrl of the first microprocessor 6 is used to dynamically adjust the value of constant current output by the current regulating unit 40 (Step S110). It should be noted that, the conductivity of the liquid to be measured is considered a low one, so the detection signal delivered by the first microprocessor 6 is used to elevate the value of current output by the current regulating unit 40. At the same time, the first microprocessor 6 switches the first switching element 44, the second switching element 46, the third switching element 48 and the fourth switching element 50 so as to generate the induced electromotive force between two ends of the sensing electrode 22. The induced electromotive force is filtered, magnified and converted by the flow-sensing device 5 and then is transmitted back to the first microprocessor 6. Then, the first microprocessor 6 calculates the flow rate of the liquid via the mechanism converting voltage into flow rate (Step S112).

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An electromagnetic flowmeter with variable-frequency conductivity-sensing function for a liquid in a tube comprising:
    a first microprocessor;
    a transducer comprising two coils and two sensing electrodes;
    an exciting-current generating device electrically connected to the first microprocessor and the coils;
    a flow-sensing device electrically connected to the first microprocessor;
    a variable-frequency conductivity measuring device electrically connected to the first microprocessor, and
    a switch electrically connected to the sensing electrodes, the first microprocessor, the flow-sensing device, and the voltage-amplitude conductivity measuring device,
    wherein the switch makes an electrical connection between the sensing electrodes and the flow-sensing device or an electrical connection between the sensing electrodes and the variable-frequency conductivity measuring device according to a signal sent by the first microprocessor, the first microprocessor makes the exciting-current generating device generate an exciting current when the sensing electrodes and the flow-sensing device are electrically connected so as to calculate flow rate of the liquid, the first microprocessor stops the exciting-current generating device to generate the exciting current when the sensing electrodes and the variable-frequency conductivity measuring device are electrically connected, the variable-frequency conductivity measuring device outputs a square-wave signal when the sensing electrodes are immerged into the liquid so as to calculate conductivity of the liquid.

2. The electromagnetic flowmeter with variable-frequency conductivity-sensing function for a liquid in a tube in claim 1, wherein the variable-frequency conductivity measuring device comprises:
    a square-wave generator electrically connected to the switch; and
    a level transformer electrically connected to the square-wave generator and the first microprocessor,
    wherein the sensing electrodes are immerged in the liquid, the sensing electrodes and the liquid generate an inductive impedance together, square-wave generator and the inductive impedance collectively form the square-wave signal, level of the square-wave signal is transferred by the level converter and then transmitted to the first microprocessor, and the first microprocessor calculated the conductivity of the liquid.

3. The electromagnetic flowmeter with variable-frequency conductivity-sensing function for a liquid in a tube in claim 2, wherein the square-wave generator comprises an operational amplifier, a capacitor, a first resistor, and a second resistor, the second resistor is electrically connected to the first resistor in series, the operational amplifier comprises an inverted input, a non-inverted input, and an output, the non-inverted input is electrically connected to the capacitor, the inverted input is electrically connected to the first resistor and the second resistor, and the output is electrically connected to the first resistor.

4. The electromagnetic flowmeter with variable-frequency conductivity-sensing function for a liquid in a tube in claim 2, wherein the level converter comprises a photocoupler, a current-limiting resistor, and a pull-down resistor, the photocoupler comprises a light-emitter and a photo-sensor, the light-emitter is electrically connected to the current-limiting resistor, and the photo-sensor is electrically connected to the pull-down resistor.

5. The electromagnetic flowmeter with variable-frequency conductivity-sensing function for a liquid in a tube in claim 4, wherein the light-emitting resistor is a light emitting diode (LED), and the current-limiting resistor is electrically connected to the anode of the light-emitter.

6. The electromagnetic flowmeter with variable-frequency conductivity-sensing function for a liquid in a tube in claim 4, wherein the photo-sensor is a phototransistor, collector of the photo-sensor is electrically connected to a direct current power source, emitter of the phototransistor is electrically connected to the pull-down resistor and the first microprocessor.

7. The electromagnetic flowmeter with variable-frequency conductivity-sensing function for a liquid in a tube in claim 1, wherein the exciting-current generating device comprises a current regulating unit, a first switching element, a second switching element, a third switching element, and a fourth switching element, the current regulating unit is electrically connected to the first microprocessor, the first switching unit, the second switching unit, the third switching unit, and the fourth switching unit.

8. The electromagnetic flowmeter with variable-frequency conductivity-sensing function for a liquid in a tube in claim 7, wherein the exciting-current generating device further comprises a coil anomaly detector, and the coil anomaly detector is electrically connected to the first microprocessor, the current regulating unit, the third switching unit, and the fourth switch unit.

9. The electromagnetic flowmeter with variable-frequency conductivity-sensing function for a liquid in a tube in claim 8, further comprising a second microprocessor electrically connected to the first microprocessor and configured to control signal communication.

* * * * *